(12) United States Patent
Gould et al.

(10) Patent No.: US 7,877,297 B2
(45) Date of Patent: Jan. 25, 2011

(54) METHOD AND SYSTEM FOR CONDITIONAL TRANSACTIONS

(75) Inventors: David A. Gould, Boulder, CO (US); Alec P. Karys, Framingham, MA (US)

(73) Assignee: 2B Wireless, Boulder, CO (US)

( * ) Notice: Subject to any disclaimer, the term of this patent is extended or adjusted under 35 U.S.C. 154(b) by 0 days.

(21) Appl. No.: 12/123,297

(22) Filed: May 19, 2008

(65) Prior Publication Data

US 2009/0171805 A1 Jul. 2, 2009

Related U.S. Application Data

(63) Continuation-in-part of application No. 11/340,046, filed on Jan. 26, 2006, and a continuation-in-part of application No. 11/601,135, filed on Nov. 17, 2006.

(60) Provisional application No. 60/938,972, filed on May 18, 2007, provisional application No. 61/015,186, filed on Dec. 19, 2007, provisional application No. 60/647,363, filed on Jan. 26, 2005.

(51) Int. Cl.
*G06Q 30/00* (2006.01)
(52) U.S. Cl. ........................................ 705/26
(58) Field of Classification Search .................. 705/26, 705/27
See application file for complete search history.

(56) References Cited

U.S. PATENT DOCUMENTS 7,210,106 B1 * 4/2007 Delnoij et al. ............... 715/810

| | | | |
|---|---|---|---|
| 2003/0061111 A1* | 3/2003 | Dutta et al. | 705/26 |
| 2004/0034568 A1* | 2/2004 | Sone | 705/26 |
| 2005/0010483 A1* | 1/2005 | Ling | 705/26 |
| 2005/0102188 A1* | 5/2005 | Hutchison et al. | 705/26 |
| 2005/0261984 A1 | 11/2005 | Hutchison et al. | |
| 2006/0004659 A1 | 1/2006 | Hutchison et al. | |

OTHER PUBLICATIONS

Anonymous, "AT&T Unveils Poweful New Web-Based Parental Control," Nov. 21-Nov. 27, 2007, Michgan Chronicle, vol. 71, Iss. 10, p. C7.*
International Search Report, PCT/US08/06432, dated Sep. 8, 2008.
Written Opinion, PCT/US08/06432, dated Sep. 8, 2008.

* cited by examiner

*Primary Examiner*—Amee A Shah
*Assistant Examiner*—Brandy Zukanovich
(74) *Attorney, Agent, or Firm*—DLA Piper LLP (US)

(57) ABSTRACT

A method and system for conditional transactions are provided. The system provides one or more master accounts wherein each master account is tied to and controlled by one or more subordinated accounts. Each subordinated account may have a configurable/customizable set of permissions defined by the master account. The subordinated account holder would optionally require permission from the master account holder to complete a purchase. The master account holder would have a number of configurable/customizable permission rules to choose from for each subordinate account.

34 Claims, 12 Drawing Sheets

```
SUBORDINATE ACCOUNT WISH LIST

[ VIEW ]  [ BUY ]  [ REMOVE ]

SELECT        ITEM                    PRICE        DATE PLACED ON WISH LIST
  ☐      IPOD NANO 100GB            $234.50              5/14/08
  ☐      SONY 52" LCD TELEVISION    $3,213.89            2/1/08

[ BACK ]
```

SUBORDINATE ACCOUNT LISTING:

[EDIT] [DELETE] [VIEW PURCHASES] [ADD NEW]

| SELECT | NAME |
|---|---|
| ☐ | JOHN DOE JUNIOR |
| ☐ | JANE DOE JUNIOR |

[BACK]

ADD NEW SUBORDINATE

FIRST NAME: ____
LAST NAME: ____
E-MAIL: ____
MOBILE NUMBER: ____

SHIPPING ADDRESS: *ADD ADDITIONAL*
☐ *SAVE AS MAIN BILLING ADDRESS*

ADDRESS 1: ____
ADDRESS 2: ____
CITY: ____
STATE: ____
ZIP: ____

PERMISSIONS *(SELECT ONE)*:
☐ *NOTIFY ME FOR ALL PURCHASES*
☐ *NOTIFY ME FOR ALL PURCHASES GREATER THAN DOLLAR AMOUNT BELOW*
   ENTER DOLLAR AMOUNT: $____
☐ *REQUEST APPROVAL FOR ALL PURCHASES*
☐ *REQUEST APPROVAL FOR ALL PURCHASES GREATER THAN DOLLAR AMOUNT BELOW*
   ENTER DOLLAR AMOUNT: $____
☐ *I DO NOT REQUIRE NOTIFICATION FOR THIS SUBORDINATE'S PURCHASES THROUGH MSHOPPER*

TERMS AND CONDITIONS
☐ *I HAVE REVIEWED THE TERMS AND CONDITIONS AND APPROVE*

[SAVE] [CANCEL]

FIG. 5

SUBORDINATE ACCOUNT WISH LIST

[VIEW] [BUY] [REMOVE]

| SELECT | ITEM | PRICE | DATE PLACED ON WISH LIST |
|---|---|---|---|
| ☐ | IPOD NANO 100GB | $234.50 | 5/14/08 |
| ☐ | SONY 52" LCD TELEVISION | $3,213.89 | 2/1/08 |

[BACK]

LICENSOR WEB SITE - ACCOUNT SETUP PAGE

MASTER ACCOUNT INFO
NAME: ▭
ADDRESS:
  STREET: ▭
  CITY: ▭
  STATE: ▭
  ZIP: ▭
PHONE: ▭
E-MAIL: ▭

ENROLL NOW IN (LICENSOR NAME) FAMILY PLAN!!! [FAMILY PLAN SETUP]

[CANCEL] [SAVE AND CLOSE]

⇒

SUBORDINATE ACCOUNT LISTING:

[EDIT] [DELETE] [VIEW PURCHASES] [ADD NEW]

| SELECT | NAME |
|---|---|
| ☐ | JOHN DOE JUNIOR |
| ☐ | JANE DOE JUNIOR |

[BACK]

⇓

ADD NEW SUBORDINATE

FIRST NAME: ▭
LAST NAME: ▭
E-MAIL: ▭
MOBILE NUMBER: ▭

SHIPPING ADDRESS: ADD ADDITIONAL
☐ SAME AS MAIN BILLING ADDRESS

ADDRESS 1: ▭
ADDRESS 2: ▭
CITY: ▭
STATE: ▭
ZIP: ▭

PERMISSIONS *(SELECT ONE):*
☐ NOTIFY ME FOR ALL PURCHASES
☐ NOTIFY ME FOR ALL PURCHASES GREATER THAN DOLLAR AMOUNT BELOW
    ENTER DOLLAR AMOUNT: $▭
☐ REQUEST APPROVAL FOR ALL PURCHASES
☐ REQUEST APPROVAL FOR ALL PURCHASES GREATER THAN DOLLAR AMOUNT BELOW
    ENTER DOLLAR AMOUNT: $▭
☐ I DO NOT REQUIRE NOTIFICATION FOR THIS SUBORDINATE'S PURCHASES THROUGH MSHOPPER

TERMS AND CONDITIONS
☐ I HAVE REVIEWED THE TERMS AND CONDITIONS AND APPROVE

[SAVE] [CANCEL]

FIG. 8

```
CREDIT CARD WEB SITE - ACCOUNT SETUP PAGE
            MASTER ACCOUNT INFO
NAME:          [        ]
SOC. SEC NBR:  [        ]
ADDRESS:
  STREET:      [        ]
  CITY:        [        ]
  STATE:       [  ]
  ZIP:         [    ]
PHONE:         [        ]
E-MAIL:        [        ]

ENROLL NOW IN
(LICENSOR NAME)    [FAMILY PLAN SETUP]
FAMILY PLAN!!!

[CANCEL] [SAVE AND CLOSE]
```

FIG. 10

```
SUBORDINATE ACCOUNT LISTING:
[EDIT] [DELETE] [VIEW PURCHASES] [ADD NEW]

SELECT          NAME
  □        JOHN DOE JUNIOR
  □        JANE DOE JUNIOR

[BACK]
```

```
ADD NEW SUBORDINATE
FIRST NAME:  [        ]        PERMISSIONS (SELECT ONE):
LAST NAME:   [        ]        □ NOTIFY ME FOR ALL PURCHASES
E-MAIL:      [        ]        □ NOTIFY ME FOR ALL PURCHASES GREATER
MOBILE NUMBER: [      ]          THAN DOLLAR AMOUNT BELOW
                                     ENTER DOLLAR AMOUNT: $[    ]
SHIPPING ADDRESS: ADD ADDITIONAL □ REQUEST APPROVAL FOR ALL
         □ SAME AS MAIN BILLING ADDRESS   PURCHASES
                               □ REQUEST APPROVAL FOR ALL
ADDRESS 1: [        ]            PURCHASES GREATER THAN DOLLAR
ADDRESS 2: [        ]            AMOUNT BELOW
CITY:      [        ]                ENTER DOLLAR AMOUNT: $[    ]
STATE:     [    ]              □ I DO NOT REQUIRE NOTIFICATION FOR
ZIP:       [    ]                THIS SUBORDINATE'S PURCHASES
                                 THROUGH MSHOPPER

TERMS AND CONDITIONS
                               □ I HAVE REVIEWED THE TERMS AND
[SAVE] [CANCEL]                  CONDITIONS AND APPROVE
```

FIG. 11

CHOOSE SUBORDINATE ACCOUNT: ALL ACCOUNTS
BEGINNING DATE: [          ]  ENDING DATE: [          ]
CHOOSE STATUS: ALL STATUSES

+ JOHN DOE JR
ORDER #1    APPROVED - 5/12/08    $N,NNN.NN
ORDER #2    APPROVED - 3/14/08    $N,NNN.NN
ORDER #3    PENDING - 5/14/08     $NN.NN       [APPROVE]  [DECLINE]
ORDER #4    DECLINED - 5/16/08    $N.NN

+ JANE DOE JR
ORDER #1    PENDING - 5/05/08     $N,NNN.NN    [APPROVE]  [DECLINE]
ORDER #2    PENDING - 4/15/08     $N.NN        [APPROVE]  [DECLINE]

[CLOSE]

ACCOUNT SETUP PAGE - MASTER ACCOUNT INFO

NAME: [          ]
ADDRESS:
  STREET: [          ]
  CITY: [          ]
  STATE: [    ]
  ZIP: [    ]
HOME PHONE: [          ]
MOBILE PHONE: [          ]
E-MAIL: [          ]

BILLING INFORMATION
NAME ON CARD: [          ]
CARD TYPE: [     ]
CARD NUMBER: [          ]
SECURITY CODE: [    ]   *WHAT IS THIS?*

ENROLL NOW IN
FAMILY PLAN!!!      [FAMILY PLAN SETUP]

[CANCEL] [SAVE AND CLOSE]

FIG. 13

METHOD AND SYSTEM FOR CONDITIONAL TRANSACTIONS

PRIORITY CLAIM/CROSS-REFERENCE TO RELATED APPLICATIONS

This application claims benefit under 35 USC 119(e) to U.S. Provisional Patent Application Nos. 60/938,972 filed on May 18, 2007 and entitled "Method and System for Conditional Transactions" and 61/015,186 filed on Dec. 19, 2007 and entitled "Method and System for Conditional Transactions" both of which are incorporated herein by reference. This application also claims priority under 35 USC 120 and is continuation in part of U.S. patent application Ser. No. 11/340,046 filed on Jan. 26, 2006 entitled "Method and System for Transmitting Real-Time or Near Real Time Price Comparison and/or Product Information to Potential Consumers and For Facilitating Optional Fulfillment and Optional, Automated, Real-Time or Near Real-Time "Reverse Auctions Through Wireless or Wireline" which in turn claims the benefit from U.S. Provisional Patent Application No. 60/647,363, filed Jan. 26, 2005, entitled, "A Method and System for Transmitting Real-Time or Near Real Time Price Comparison and/or Product Information to Potential Consumers and Also Facilitating Real-Time or Near Real-Time "Reverse Auctions", Purchase, Payment and Fulfillment Alternatives," and claims priority under 35 USC 120 and is a continuation in part of U.S. patent application Ser. No. 11/601,135 filed on Nov. 17, 2006 entitled "Method and Apparatus for Encouraging Wireless Device Users to Send Marketing Messages Via a Wireless Communications Network", all of which are incorporated herein by reference.

FIELD

A system and method for e-commerce and mobile commerce (m-commerce) are disclosed.

BACKGROUND

According to 2005 U.S. census estimates, approximately 14% of the U.S. population, more than 40 million people, are between the ages of 10 and 19. Recent surveys suggest that of these, less than 15% have access to their parents' credit or debit cards. At the same time, approximately $4 trillion is spent by U.S. consumers shopping. Of this amount, some research suggests that more than 50% is paid for using either credit cards or debit cards. Adding stored value cards purchases would add considerably to the total volume of transactions made by credit, debit or stored value cards (hereafter referred to "Electronic Payment Media"). A majority of purchases are made using Electronic Payment Media. At the same time, the majority of college students, teenagers and pre-teens do not have access to such cards. And so, there has been an ongoing intensifying debate amongst parents whether or not kids should be given access to Electronic Payment Media. There are good reasons for this. Are kids emotionally ready for access to Electronic Payment Media? Are they responsible enough to handle the financial implications that can dramatically impact their parents who are usually financially responsible for their purchases? And how do parents control their purchases? Regardless of debit, credit or stored value, once in the hands of kids, kids can usually make purchases without parent approval subject only to the credit or balance limitations associated with their Electronic Payment Media. Additionally, there are issues of lost cards, credit exposure, identity theft and the other financial risks that make providing access to such payment solutions for kids a difficult decision. It might also be noted many spouses and domestic partners do have access to Electronic Payment Media but lack the financial responsibility to control their spending against such Electronic Payment Media.

There is through embodiments described herein, a method and system empowering children, and other financially irresponsible individuals with an ability to shop on their own and eliminate the need for cash using Electronic Payment Media and real-time electronic communications, such as email and text messaging. A method and system are described to convey real-time control to parents and guardians in advance of intended purchases by those under their guardianship. By way of embodiments, a method and system is described to provide for the approval and/or disapproval of aforementioned intended purchases. Such methods and systems described have heretofore not been available.

Embodiments are described herein for online e-commerce websites and the use of conditional purchases using electronic payment media. The use of cell phones, smart phones, personal digital assistants, and other handheld electronic devices (collectively "Wireless Devices"), the concurrent deployment of high speed wireless networks that connects such wireless devices, and the growing emergence of mobile commerce applications, can provide an end-to-end system that would allow minors, dependents and other people who do not otherwise possess Electronic Payment Media (hereafter referred to as "Minor Dependent" or "Minor Dependents" as the case may be) to make Conditional Purchases in or near traditional brick and mortar environments using their Wireless Devices that is subject to final approval and real-time control of their parents or guardian. An example of the workflow for creating a minor dependent sub-account is shown in FIG. 16. Furthermore, a purchase process for a minor dependent purchase using a sub-account is shown in FIG. 17. A method and system are provided for the use of traditional credit cards or debit cards so that Minor Dependents can be issued 'conditional purchase' cards associated with their parent's credit or debit cards such that they too can make purchases online or in traditional store environments subject to real time, near real time or time delayed control of their parents. Because the vast majority of retail sales occur in stores and not online (according to U.S. government estimates, more than 95% of 2004 retail sales occurred in stores as opposed to online or through catalogues), the potential market size is significant.

Thus, it is desirable to provide a conditional purchase system and method and it is to this end that the present invention is directed.

BRIEF DESCRIPTION OF THE DRAWINGS

FIG. 4 presents an illustration of the Master Account creation screen;

FIG. 5 presents an illustration of the Sub Account creation screen;

FIG. 7 presents an illustration of the "wish list" which contains rejected purchase requests;

FIG. 8 shows a licensor web site illustration;

FIG. 10 illustrates a credit card company screen for establishing Master Accounts;

FIG. 11 illustrates two credit card company screens for establishing Sub Accounts;

FIG. 12 shows a master account billing information;

FIG. 13 illustrates a licensor web site-Registration Form-Master Account Holder;

DETAILED DESCRIPTION OF ONE OR MORE EMBODIMENTS

The system and method are particularly applicable to an ecommerce system implementation as described below and it is in this context that the system and method will be described. It will be appreciated, however, that the system and method has greater utility since it can be implemented in other manners than those described below.

There is provided an end-to-end method and system that facilitates (i) the conditional purchase by Minor Dependents of any item they desire to purchase (hereafter, the "Conditional Purchase"), (ii) the real-time, near real-time and time delayed opportunity for parents or other legal guardians of such Minor Dependents who possess a credit, debit or stored value card (hereafter, the "Parent or Guardian") to receive notification of an Conditional Purchase by a Minor Dependent and to review certain aspects of the Conditional Purchase including, but not limited to the product name, brand, model number, price, and merchant, (iii) the real time, near real time and time delayed opportunity for a Parent or Guardian to approve or disapprove of such Conditional Purchase such that if the Conditional Purchase may be approved by the Parent or Guardian, the Conditional Purchase gets processed as approved and payment effectuated against the Electronic Payment Medium of such Parent or Guardian. The process can optionally provide the Minor Dependent with real time, near real time, or time delayed notification of the Parent or Guardian's decision to either approve of disapprove of the Conditional Purchase.

Disapproval of the Conditional Purchase, can be provided for by the method and system to store all such disapproved Conditional Purchases in a 'wish list' so that the Conditional Purchases might be purchased at a later date. An example of the user interface for the "wish list" is shown in FIG. 7.

Minor Dependents are provided an ability to make Conditional Purchases in a context that is remote from immediate supervision of their Parent or Guardian while simultaneously providing to the Parent or Guardian the ability to monitor and control their Conditional Purchases.

An operatively configured system that desires to take advantage of the method and system described herein may be referred to as a "Licensor". Licensors may include, but are not limited to web-based e-Commerce sites, such as Amazon.com, and Walmart.com; online payment processors, such as Paypal, Paypal Pro, Google Checkout, and Chase Paymentech; cell phone company family plans, and major issuers of credit cards, such as American Express, Visa and Mastercard, as well as merchants.

Figure 1:
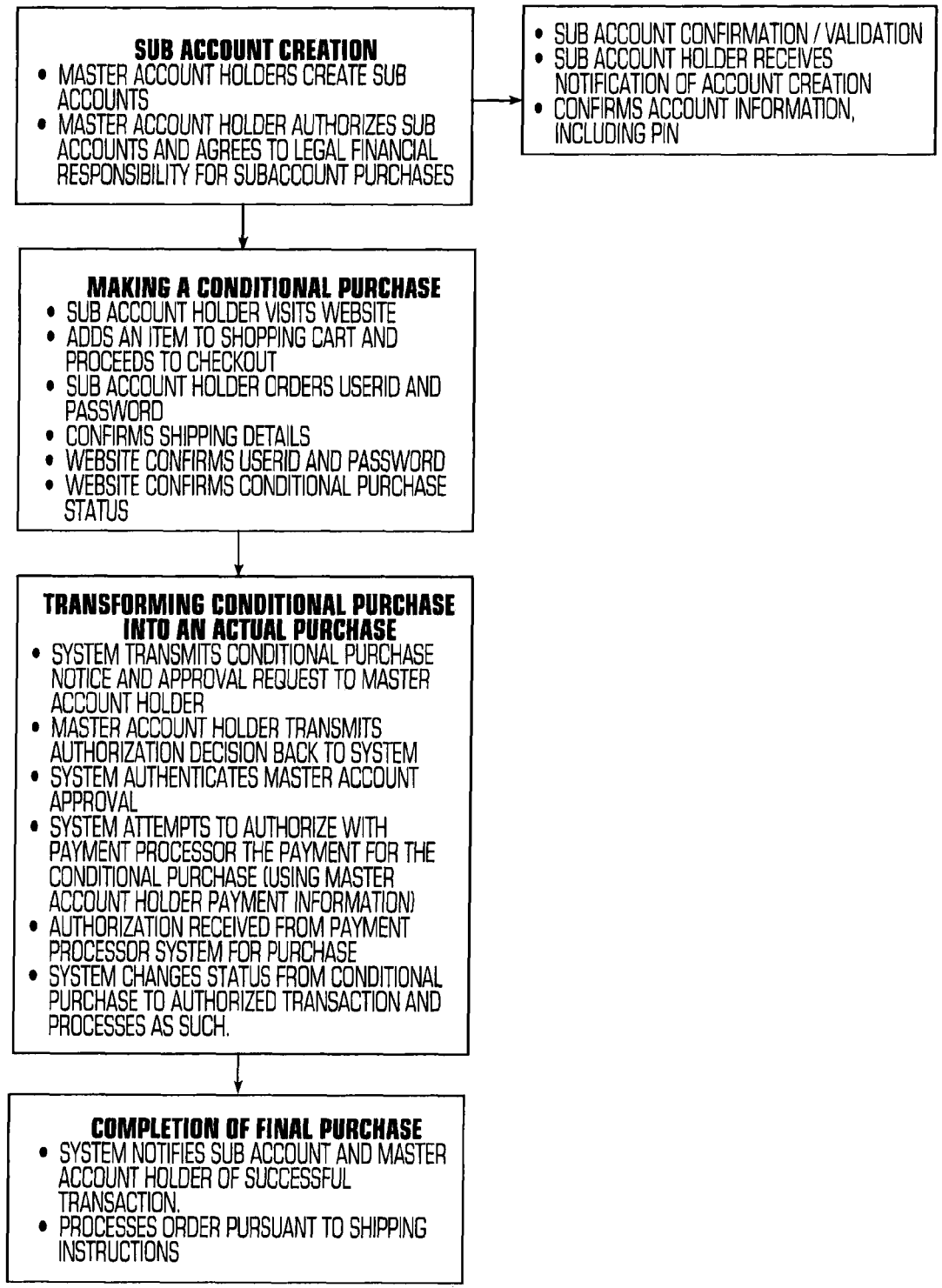
FIG. 1 shows a master workflow for a family plan system for an existing web site use case.

FIG. 1 illustrates a master workflow for a conditional purchase system and method being performed with an existing web site/ecommerce site. The method may include the process of sub-account creation, sub-account confirmation and validation, making a conditional purchase, transforming a conditional purchase into an actual purchase and completion of the final purchase wherein details of each of these processes are shown in FIG. 1 and described below in more detail.

Figure 3:
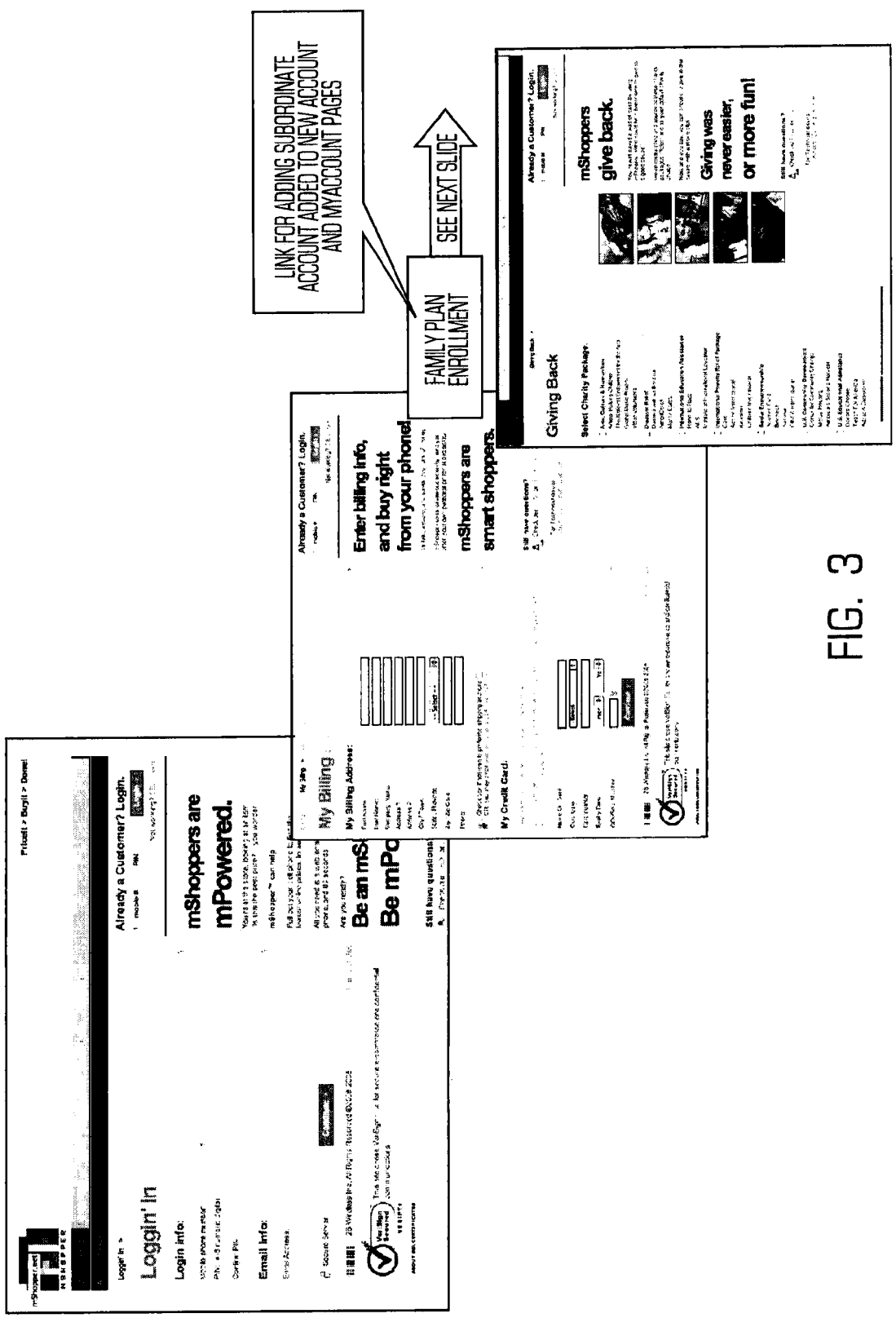
FIG. 3 presents an illustration of a customer user interface which includes a potential Master Account user and a potential Sub Account user.

Creation of Sub Accounts by a Master Account Holder. As used hereafter, a Master Account is any standard user registration account that has been created by a Parent or Guardian with a Licensor. A Master Account Holder is anyone who has successfully created a Master Account. Typically, Licensors, such as Amazon.com, require users to register with their site. Moreover, many, if not most user accounts require basic information including demographic information, such as contact information which may comprise: name, address, phone numbers, cell phone numbers, and email addresses; security information, such as usernames, passwords, and personal identification numbers (PIN); and billing information, such as credit card number, debit card number, name on card, billing address associated with the card, and card security numbers. This information may be referred to as the Master Account Billing Information. An example of the user interface showing the Master Account billing information is shown in FIG. 12. As contemplated herein, Master Accounts should include the Master Account Billing Information. If a Parent or Guardian visits a Licensor location or website and has not created a Master Account, then he should do so. Having created a Master Account with a Licensor, the Master Account Holder can be presented with an option to create one or more Sub Accounts associated with such Master Account. There is no limit to the number of Sub Accounts that may be created. A Sub Account may be linked to more than one Master Account. A Sub Account is a class of user account that is optionally created by the Master Account Holder. Sub Accounts may contain similar information as Master Accounts, including, but not limited to, the basic demographic information, contact information, security information, and optional shipping information. FIGS. 3-5 illustrate an example of a customer user interface for master accounts and sub-accounts (including a sub-account creation screen). Sub Accounts may differ from Master Accounts. They may not have their own unique payment information or Electronic Payment Media. The relationship between a Master Account and Sub-Account is that subject to the method and system described herein and further subject to the Master Account Holder's approval. Conditional Purchases made by Sub Account Holders are credited against the Master Account Billing Information associated with the Master Account Holder's Master Account Visiting a Licensor website, a Master Account Holder can be notified of this new feature and prompted via standard hyperlinks, email, banner advertisements, or other medium to add Sub Accounts to his Master Account. An example of the Licensor web site with the Master Account set-up page, the subordinate account listing and the addition of a new subordinate page are shown in FIG. 8. Clicking on said link, email or banner advertisement may bring up a web form similar in substance to an example user interface shown in FIG. 13. The form can be completed by the Master Account holder alone or together with a Child Dependent. Indeed, the system can be altered such that Child Dependents can first fill out their form and then notification is sent to the Master Account Holder to either approve or disapprove of the account as desired. Other embodiments of the system might prompt people to create Sub Accounts and to submit the relevant Sub Account information via Wireless Devices, standard voice calls, interactive voice response systems, and even regular mail or facsimile forms.

Figure 9:
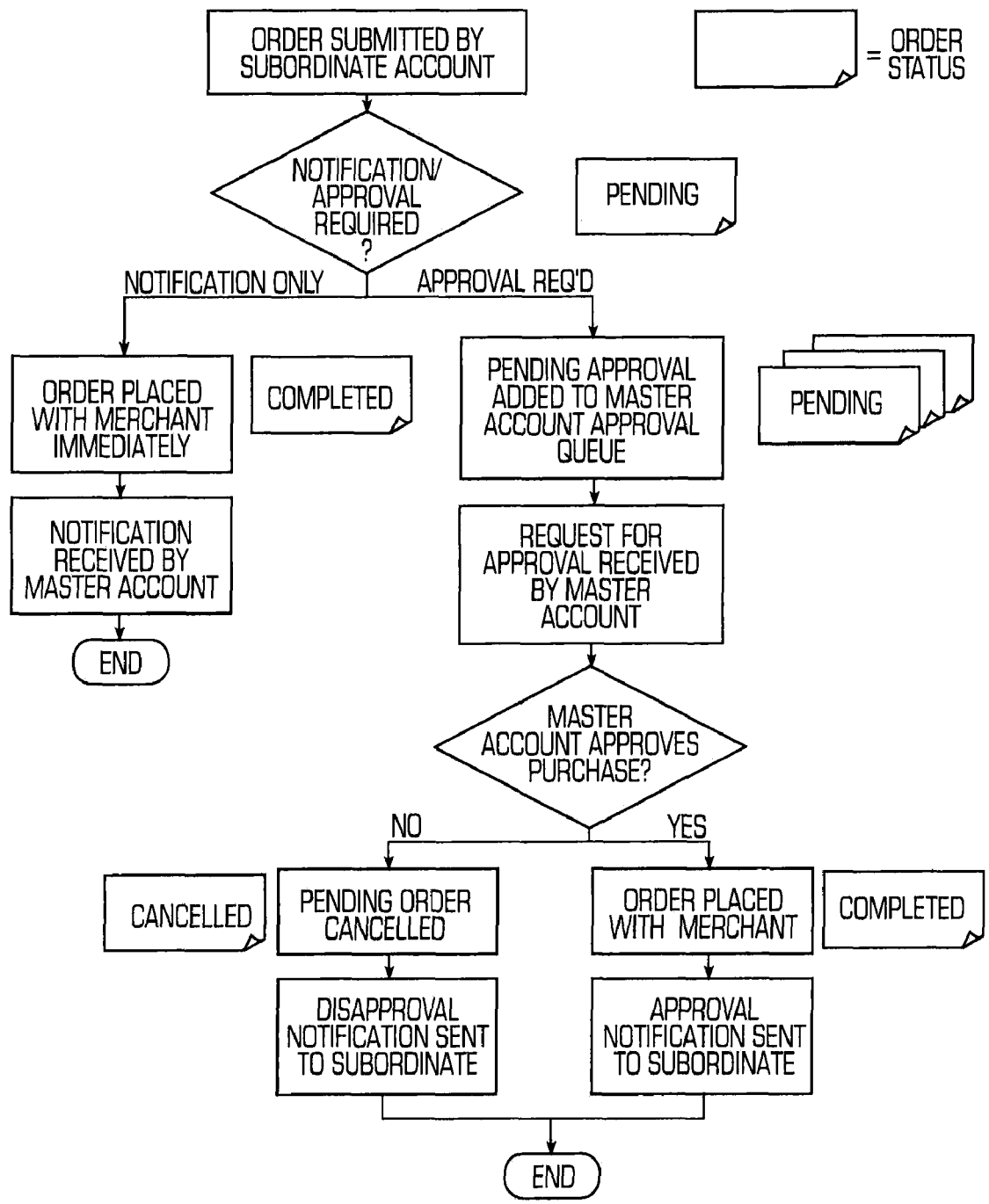
FIG. 9 illustrates a check out path illustration, normal, approved and conditional.
Figures 14A, 14B:
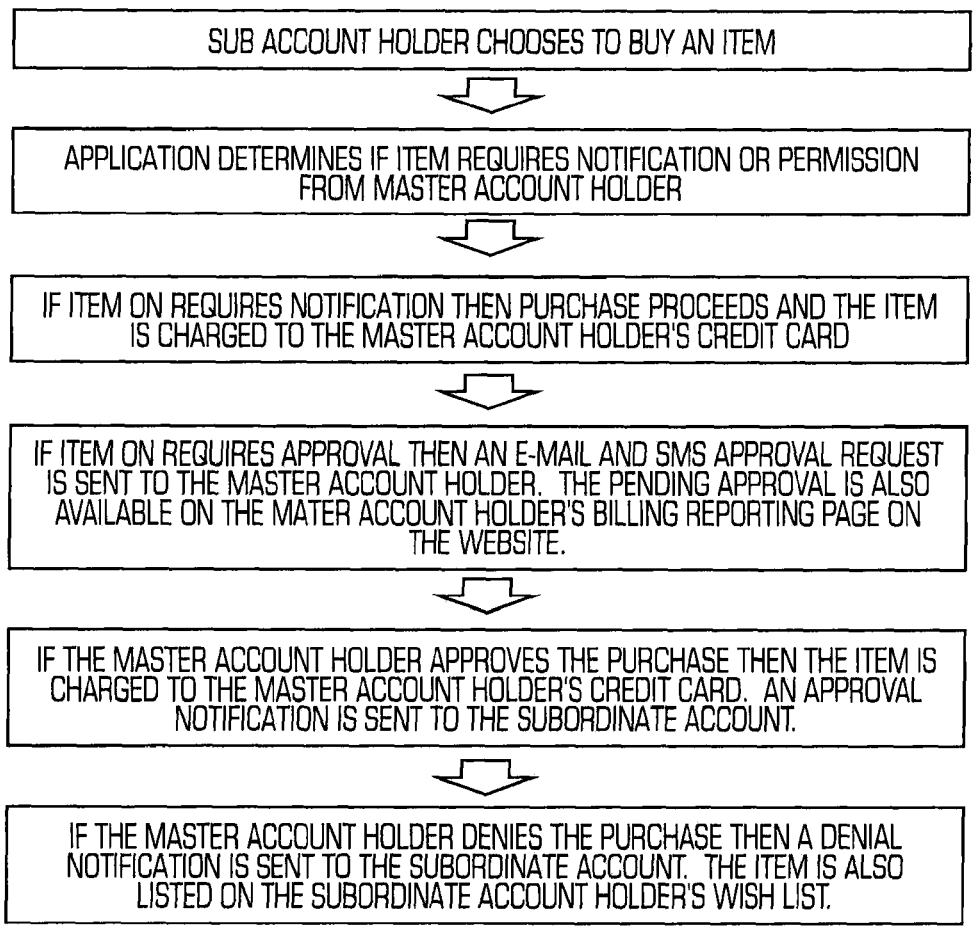
FIG. 14A illustrates a sub Account Holder-Flow at Licensor Web Site.
FIG. 14B illustrates a subordinate account user interface at Licensor Web Site.

Making Conditional Purchases. Sub Account Holders can 'conditionally shop' at the Licensor's website. As illustrated in FIG. 14A, a Sub Account Holder visits a Licensor website, finds something he/she may want to purchase, adds the good (s) to an electronic shopping cart, and proceeds to check out. Upon the initialization of the checkout process, the Licensor site recognizes, this purchase is a Conditional Purchase and this user is a Sub Account Holder. An identifier, operatively capable of being indexed, can be used to designate a Sub Account Holder, and therefore, a Conditional Purchase. As an example, Sub Accounts might have unique fields, numbers, or other binary toggles that serve to identify an account as a Sub Account. Sub Accounts can be stored in unique Sub Account tables within the system database server so purchases made by a Sub Account Holder, listed in the table, may be recognized as Conditional Purchases made by a Sub Account Holder. Having identified the purchase as a Conditional Purchase and the account as a Sub Account, the system retrieves and presents a distinct, alternative 'checkout' path (the "Sub Account Checkout Path") as outlined in FIG. 9. The Sub Account Holder is prompted to confirm the good(s), quantity, and ship-to-address. The Sub Account Holder may be prompted to finalize his conditional checkout. In the present exemplary embodiment, the Sub Account Checkout Path may prompt the Sub Account Holder to enter the username and password associated with the Sub Account to confirm the intention to conditionally purchase the good(s) in question. Use of a two factor input, such as a username and password, provide added security and reduce the likelihood of account identifier redundancy and/or confusion.

Figure 6:
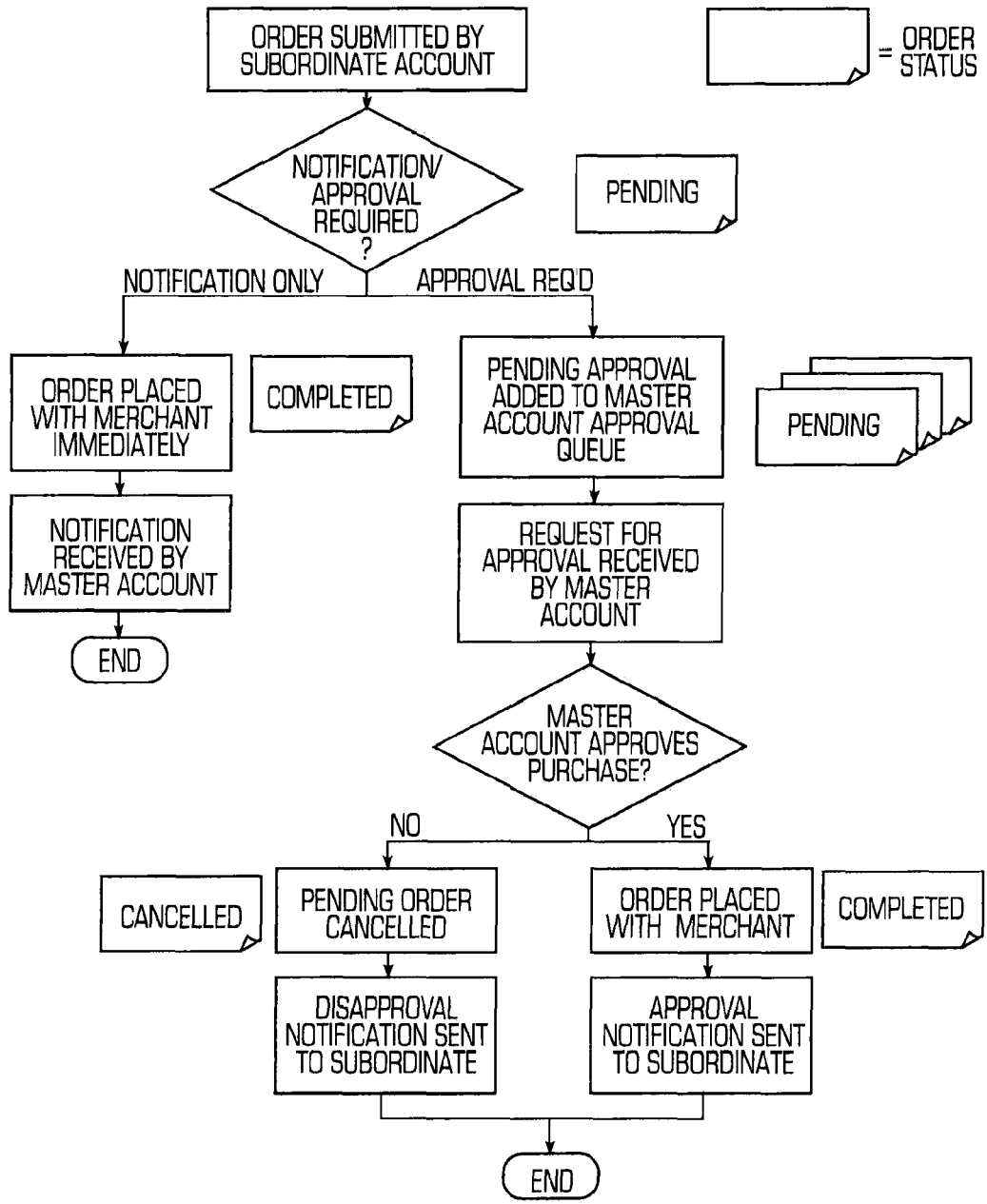
FIG. 6 presents an illustration of the order queue of conditional orders awaiting approval.

Further to the aforementioned embodiment, successful confirmation of a Conditional Purchase by the Sub Account Holder may result in the Conditional Purchase being transferred and stored in a pending Conditional Purchase order queue as shown in FIG. 6. After confirmation and validation, the Conditional Purchase requires Master Account approval. Having confirmed and validated a Conditional Purchase, a database lookup may be performed to identify the Master Account associated with this Sub Account. The Conditional Purchase is approved or disapproved by the Master Account Holder. If approved, the order may be completed using the information preserved in the queue. The queue can include a complete order information snapshot.

Using the corresponding Master Account, the system transmits a notification and request for approval to the Master Account Holder (hereafter, the "Approval Request"). The Approval Request transmits to the Master Account Holder the relevant Conditional Purchase information including, but not limited to, the Sub Account and Sub Account Holder who 'requested' the Conditional Purchase (note: more than one Sub Account can be associated with a Master Account), the requested purchase item, the merchant, price, the ship-to-address, or any other purchase related information. The Approval Request prompts the Master Account Holder to either approve or disapprove the Conditional Purchase and in so doing, authorize payment for the Conditional Purchase using the preferred Master Account Billing Information associated with said Master Account.

One exemplary method for conveying a Master Account affirmative approval might require the Master Account Holder to respond to the Approval Request by transmitting the PIN or security code associated with said Master Account back to the system such that the system can perform a database lookup to corroborate the PIN against the PIN of record contained in the Master Account Holder's Master Account. Other codes, PINs or methods of approval can be utilized.

Having established a positive match against the record in the Master Account, the system finalizes the transaction. The Master Account Holder's Billing Information is submitted via the Licensor's payment processor for approval. Approval (or denial) is authorized by such payment processor, and the Conditional Purchase paid for. The Conditional Purchase (now an actual purchase) is processed pursuant to the instructions as contained in the original Conditional Purchase order. The system can transmit final disposition information to both the Master Account and Sub Account Holders notifying them of purchase details using communication methods comprising e-commerce, text messaging, fax, voice, or interactive voice response protocols. An example of the subordinate account user interface at a licensor's web site is shown in FIG. 14B.

Figures 15, 16:
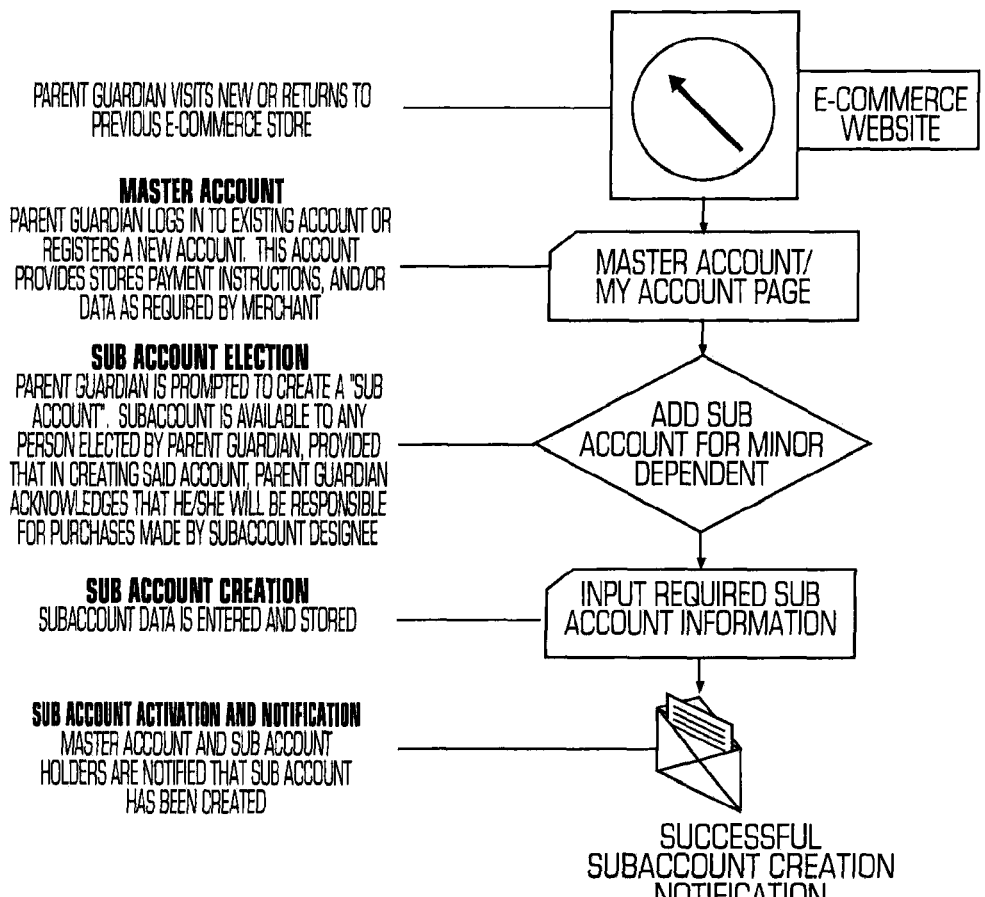
FIG. 15 illustrates a master Account Holder-Authorization and Denial Rules.
FIG. 16 illustrates sub account information.
Figure 17:
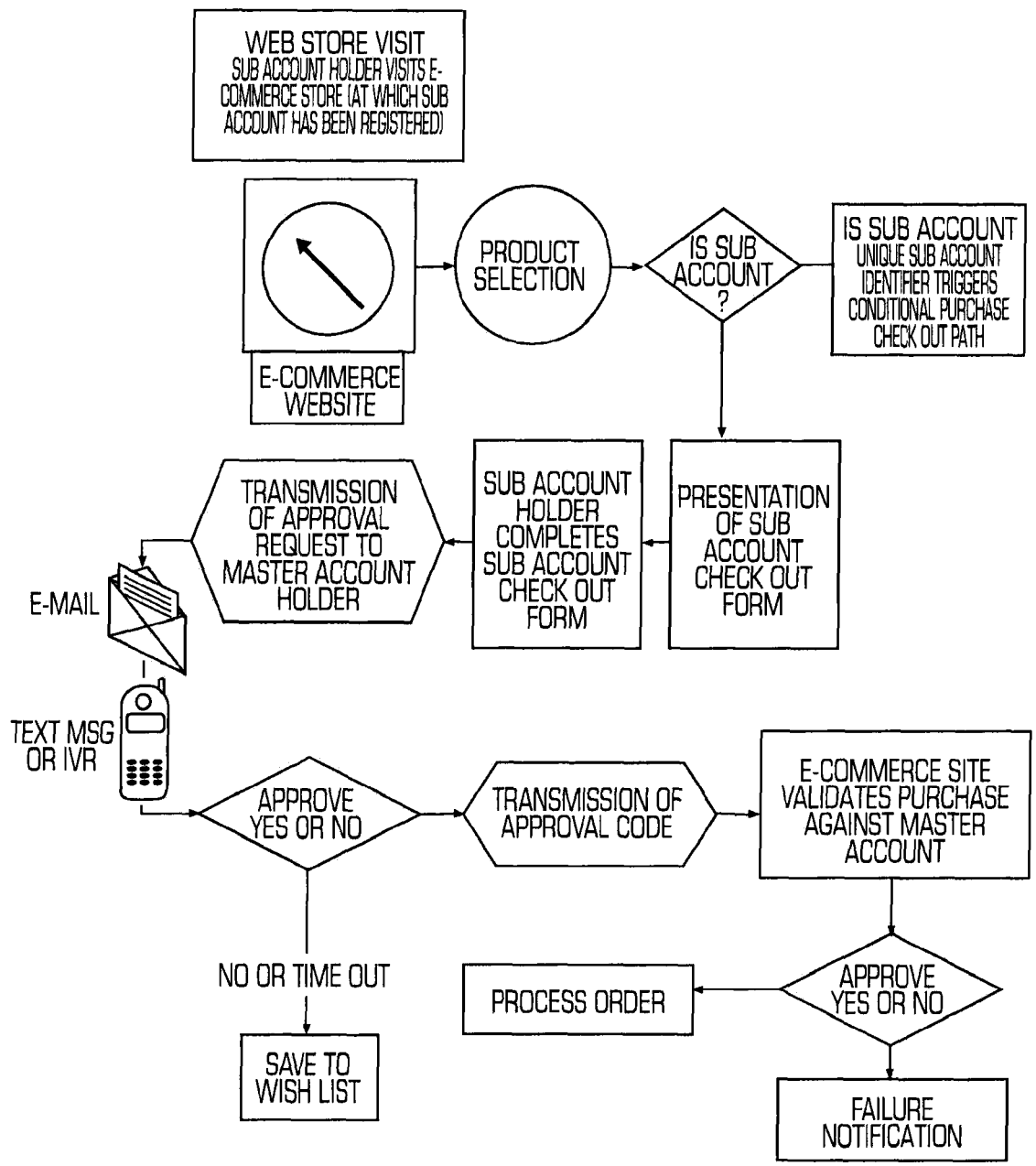
FIG. 17 illustrates a sub account check out Process.

An approval of a Conditional Purchase should require an affirmative response to the Approval Request. Master Account Holders can be prompted to pre-program authorization and denial rules for any particular Sub Account as illustrated in FIG. 15. As an example, the Sub Account of a teenager can be programmed to approve any Conditional Purchase less than $10 (Master Account Holders might initially, or by default, deny the Conditional Purchase of an individual Sub Account Holder)

The system can optionally provide for the acceptance of proactive denials transmitted back to the system that unambiguously denies the approval of the Conditional Purchase. Alternatively, the system can be programmed to 'time out' any Approval Request such that if the Master Account Holder does not transmit an authorization response to the Approval Request within a prescribed period of time, the Approval Request may be denied and the Conditional Purchase is not effectuated.

In circumstances where Approval Requests might be denied, the system can easily provide archiving of denied Conditional Purchases in a 'wish list' allowing a Master Account Holder to purchase the item(s) at a later, more advantageous time. A Sub Account Holder might re-submit the same conditional purchase for further consideration.

Inbound and outbound communications between the system, Master Account Holders and Sub Account holders can be transmitted across any wireline or wireless networks and any media compatible with said networks, including email, text messaging, interactive voice response systems, and even standard voice or voice over internet protocol technologies can be effectively used as transmission media. The proliferation of cell phones, personal digital assistants, wireless computers, and other wireless devices, amongst Minor Dependents and Parent or Guardians can be used in or near traditional 'brick and mortar' store environments. With the method and system described herein, wireless device enabled Minor Dependents located in or near traditional, 'brick and mortar' based retailers (retailers occupying actual physical retail space), can use wireless devices to access real-time price comparison and fulfillment services and may check out using a wireless system to execute their Conditional Purchase. As an example, a Parent or Guardian might register a Master Account and one or more Sub Accounts with a mobile price comparison application. A Sub Account Holder might use his/her Wireless Device to price compare an item they see in a store and then conditionally purchase the item through a wireless application. The Conditional Purchase checkout by the Sub Account Holder may prompt for the security code associated with a Sub Account. A two factor security algorithm, one using two inputs to confirm a user's identity, might correlate the Sub Account security code with the Sub Account Holder's mobile number of record. The system might then process the Conditional Purchase in a manner, such that, Approval Requests could be simultaneously transmitted to the Master Account Holder's email address and via a text message sent to the Master Account Holder's cell phone of record. Having received a text message Approval Request, the Master Account Holder can approve or deny the Conditional Purchase by transmitting a text message response containing an appropriately formatted security code.

In another embodiment, there exist a method and system for providing use of Conditional Purchase Cards. The vast majority of purchases are made in traditional 'brick or mortar' retailer environments. Because many Minor Dependents spend their leisure time at shopping malls and plazas hosting retailers, there is a high likelihood they will purchase goods requiring approval from their Parent or Guardian. Licensors, such as the major credit card companies, may promote existing or new applicants to add Sub Accounts to their existing credit card account, providing Minor Dependents or other Sub Account holders the opportunity to make use of a Conditional Purchase Card. Sub Accounts can be added using paper, electronic, or even interactive voice response methodologies. A "Conditional Purchase Card" can be issued in the name, and for the benefit of, the Sub Account Holder. Examples of the credit card company screens for establishing accounts and subordinate accounts are shown in FIGS. 10-11. The Sub Account Holder can visit a store of his or her choosing that accepts the brand of credit card associated with the Master Account (and Sub Account). The clerk processes the Conditional Purchase. The system, having recognized the card number as a Conditional Purchase Card, would prompt the clerk to 'hold' the package until final authorization is received. An Approval Request is transmitted to the Master Account Holder using a transmission media, such as the web, wireless or the like. The Master Account Holder transmits approval (or disapproval) of the Conditional Purchase back to the system for final processing. If approval is given, the Master Account Billing Information is authorized and notice is sent back to the merchant and to the Sub Account Holder.

Description of a Conditional Purchase System

Figure 2:
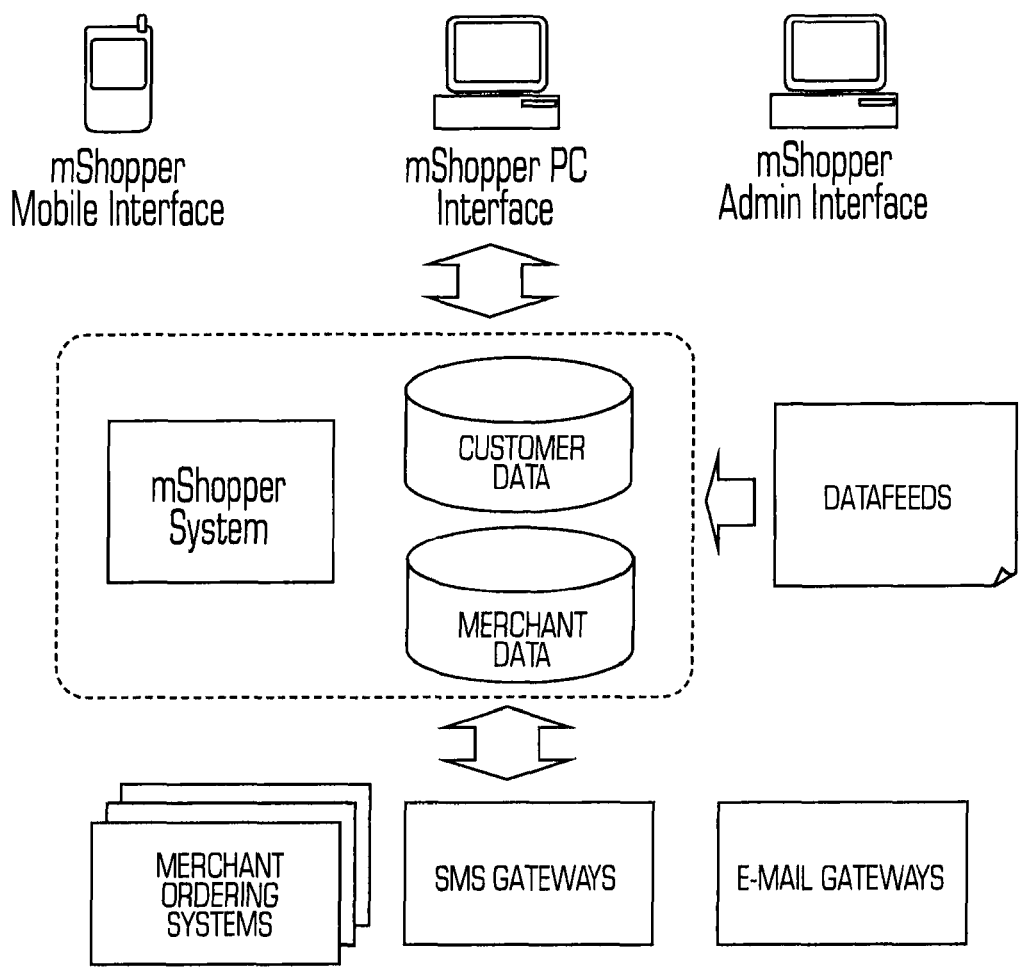
FIG. 2 is a diagram of a family plan system showing connections to customer communications devices and merchant servers.

In one embodiment, the system (an example of which is shown in FIG. 2) comprises a customer user interface, one or more databases, one or more servers and several modules which may comprise, an accounts module, an ordering module, a fulfillment module, a customer tracking module, a security module that controls access to the master account and sub-accounts, an auditing module and an accounting module which may all be implemented in software (a plurality of lines of computer code) in one embodiment. The one or more system databases may comprise a registered users database, which may include all Master Accounts and related Sub Accounts, with all related data. The system may also include logic governing the actions between a Master Account and all related Sub Accounts, such as approval thresholds. Such thresholds may be dynamic. Furthermore, the approval may be category based meaning that the master account may require purchase approval for certain types of items. The accounts module handles the master and sub accounts, registration of the master and sub accounts and the logic governing the actions between the master accounts and the sub accounts. The system may comprise an application programming interface ("API") providing streamlined integration into existing electronic commerce applications. A system in accordance with the present invention should be highly flexible to accommodate the differing needs of Licensors, Purchasers, Master Account holders, Sub Account holders and merchants. System components can be hardware independent, allowing the interchangeability of the computer hardware on which the server software operates. The components comprising the system may reside in the same physical location, such as on the same computer hardware, or may be located in separate physical locations.

In the aforementioned embodiment, the interface can be a menu-driven interface for the input of descriptive information relating to the Metadata, such as provided by a graphical user interface (GUI). Data can be entered into fields provided on the interface; wherein the fields are arranged to aid the user. Input can be gathered from a standard cell phone keyboard, a modern keyboard layout, such as a "QWERTY" compatible keyboard, or using existing interactive voice recognition (IVR) technologies. Metadata can be transmitted via a standard phone call which may be answered by automated or manned systems , such as a call center.

Further to the embodiment, the potential purchaser can use a keypad on a communications device, such as for example, a Dual-Tone Multi Frequency (DTMF) device, to input the descriptive information about the product and/or service when formulating the product or service comparison query. The potential purchaser can also use speech Interactive Voice Response (IVR) to input the descriptive information about the goods and/or service. For example, the potential purchaser can be provided with a speech Interactive Voice Response customer user interface that prompts the purchaser for descriptive information. The speech Interactive Voice Response customer user interface may be written in VoiceXML or SALT and use Microsoft Speech Server software residing on server hardware, such as for example Intel architecture machines. In another example, the purchaser can use the keypad on a mobile phone to compose a text message containing the descriptive information about the product and/or service, which can be sent as the query. Furthermore, the descriptive information about a product or service can be entered into the query using Automatic Speech Recognition (ASR), such as that provided by Nuance, Inc. In such a case, a telephone caller can use his/her own voice to speak the descriptive information about a product and/or service to supplement or obviate the use of a keypad. Wireline as well as Mobile telephone callers can make full use of the system via Automatic Speech Recognition without having to press telephone keys.

In another embodiment, the descriptive information about a product and/or service can be entered into the customer user interface using a bar code scanner. A purchaser may wish to compare prices on a single product or service. Similarly, the descriptive information about the product and/or service can be entered into the query by receiving information contained in a Radio Frequency Identification (RFID) tag, which contains the descriptive information about the product and/or service in an electronic form readable by a Radio Frequency Identification transceiver. The Radio Frequency Identification transceiver that receives the descriptive information about the product and/or service can, for example, be embedded into the potential purchaser's communications device (such as a cell phone).

In another embodiment, the customer user interface may be located remotely from the potential purchaser. The purchaser may contact a call-center and speak with an agent, who inputs the descriptive information about a product or service into the customer user interface based on the potential purchaser's instructions. Also, where the customer user interface is located remotely from the potential purchaser, any of the above-described methods for entering descriptive information about the product and/or service (electronic forms, OCR, ASR, etc.) can be used.

Transmissions to and from the system are carried via a communications link. The communications link can be, without limitation, any existing or future wireless or wireline Internet, wireless or wireline data network, wireless or wireline voice network, or wireless or wireline data or voice technology that can be used to transmit the metadata as inputted by the consumers to the centralized servers and databases. Wireless data can be transmitted using existing cell phone companies as distribution intermediaries. The communications link may provide passing of the metadata from the user's cell phone through the carriers' networks and related systems, and into the servers and databases.

The one or more databases and one or more servers may be centralized or disseminated or a network and may be designed to manage the entire system including receiving the incoming metadata or query from the communications link, processing the query using an appropriate price or product comparison search technology, and handling reverse auction requests. Furthermore the databases may include all details for registered users, Master Account and Sub Account holders, as well as detailed transaction history, and all related logic. The hardware may be configured to work with operating systems, such as the Linux operating system, and servers, such as the Hewlett-Packard Blade server. Server software, such as Apache server software, may be configured to implement the one or more databases managed by software, such as mySQL database software. The LAMP Framework (Linux, Apache, mySQL, PHP, Python, PERL) is preferably used for application development. Websites hosted on the one or more databases and one or more servers may run server software, such as Microsoft IIS server software. The price or product comparison engine can comprise Internet based price or product comparison shopping engines, such as PriceGrabber or ShopZilla, or the price or product comparison engine may be a proprietary module. The system may include a method for transferring appropriately formatted metadata to such outsourced comparison engine and for receiving query results from the same outsourced comparison engine. The transfer of such appropriately formatted metadata to the outsourced comparison engine and the receipt of any price or product comparison data from the outsourced comparison engine may be effected via any existing or future data transmission network, including an electronic data interface, a virtual private network, or the internet, formulating and formatting a response to the query (the "price comparison data result" or "product comparison data result").

In response to the price comparison data result or product comparison data result, the customer may decide to purchase the product in question from one of the retailer alternatives presented in the price comparison data result or product comparison data result (as opposed to purchasing the product from the retail store in which the consumer may then be located at the time he/she initiated the query). In such instances, the system would provide for the real time or near real time ordering of such product through such alternative retailer or supplier. Any ordering and fulfillment requested by the consumer can be effectuated by prompting the consumer to input all the relevant purchasing information (billing, shipping, etc.), by accessing customer information pre-stored on a customer account database, or by automatically directing such consumer to a remote call center which may then act as an agent to input the same relevant purchasing information on his/her behalf. Where a call center is used, the system can automatically transmit the metadata and vendor or supplier of choice as selected by the consumer to such call center in order to automate and streamline the order process.

The customer may decide not to purchase a product or service in response to a price or product comparison query. In such a case, the system can give the customer the opportunity to receive information contained within the price or product comparison result via SMS and/or e-mail, preferably the top three merchants. The system can prompt the customer to input an e-mail address or can access a customer account database to determine whether the customer has stored an e-mail address. The system can then e-mail the price or product comparison information to the customer's e-mail address The price or product comparison data result can include the amount of money the customer has saved through conducting a price or product comparison query. The customer can be prompted to donate some or all of the amount saved to one or more of the customer's favorite charities. The system allows the customer to identify and store the one or more favorite charities on a customer account database. When the customer donates an amount of savings to a charity, the system transmits the information necessary to effect the donation (such as a credit card number) to the charity and also transmits a donation confirmation to the customer's communications device. The system can include one or more product catalog database(s), which store information relating to products and/or services and are searched in response to a customer query. The product catalog database(s) may reside along with other components of the centralized databases and servers or be located remote from them. Where the product catalog database resides within the centralized databases and servers, the information relating to products and/or services can be populated and/or updated via an automatic process, wherein the system accesses merchant databases or websites and downloads information from them. Populating or updating the product catalog database(s) is done preferably through an automatic ftp or http datafeed from the merchant databases and/or through a web crawler that searches merchant databases or websites on a predetermined list for product and/or service information. The result is a near-real time product catalog database. Furthermore, this product catalog may be improved via data mapping, brand recovery, model recovery and brand normalization. The system can also obtain information relating to products and/or services directly from merchant databases in response to a customer query.

As stated above, the system can include a customer account database that stores information relating to customers using the system. Users can register information in advance, preferably via a registration process at a predefined website, into the customer account database so that the purchasing process can be further streamlined. Information stored on the customer account database can include, for example, names, nicknames, mailing addresses, telephone numbers, e-mail addresses, websites, credit card information, shipping information, billing information, favorite charities, and any other customer information desired. The system will store such information so that repeat users can quickly effectuate future purchases. This information can be accessed and/or protected by a personal identification number (PIN), security code, or other personal identifier established at the time of registration.

The system can include a transaction database, which stores information relating to all transactions customers have carried out using the system. Information stored on the transaction database can include the product and/or service that was the subject of a price or product and/or service comparison or reverse auction, the date and time of each price or product and/or service comparison carried out, the date and time of each reverse auction carried out, the result of each price or product and/or service comparison and reverse auction, the amount saved in each transaction, the amount donated from the savings in a transaction (if any), and any other information regarding any transaction carried out by users of the system.

Reliability. Because of the nature and real time sensitivity of e-commerce transactions, redundancy can be utilized to accommodate fault tolerance, including suspend and resume processes.

Security. All stored and transmitted data can be tracked and encrypted. Multiple layers of security can be further utilized to assure maximum security, including authentication, authorization, and access control, such as those offered by Computer Associates or RSA.

The conditional purchase system and method may be used to convert traditional credit cards, debit cards, stored value cards or merchant credit cards into conditional purchase cards using the system.

When a master account approves an item purchase by a sub-account, the conditional purchase system and method may require the master account holder to respond to the approval request by transmitting a code, such as a personal identification number or security code, etc., associated with the master account back to the system such that the system can perform a database lookup to corroborate the code against the code of record contained in the master account holder's master account.

The communications between the master account holder, the sub-account holders and the conditional purchase system may be transmitted across any wireline or wireless networks and any media compatible with said networks, including email, text messaging, interactive voice response systems, and even standard voice or voice over internet protocol technologies can be effectively used as transmission media.

When the sub-account is a minor dependent, the minor dependents are provided an ability to make conditional purchases in a context that is remote from immediate supervision of their Parent or Guardian while simultaneously providing to the Parent or Guardian the ability to monitor and control their Conditional Purchases.

A licensor's website may notify a master account holder to add sub-accounts. The notification can be provided by standard hyperlinks, email, banner advertisements or other medium.

The conditional purchase system may be programmed to 'time out' any approval request such that if the master account holder does not transmit an authorization response to the approval request within a prescribed period of time, the approval request may be denied and the conditional purchase is not effectuated. The system may also be used to provide conditional purchase cards.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A computer implemented method for conditional purchase, comprising:

storing, in a registered users store, one or more master accounts associated with a conditional purchase system and one or more sub-accounts associated with the conditional purchase system, wherein each particular master account is associated with to one or more particular sub-accounts;

placing, using an ordering module executed by a server computer, an order by a user over a link to purchase an item; and controlling, using an account module, executed by a server computer, the purchasing of the one more particular sub-accounts associated with the particular master account by determining if approval of the purchase of the item by the sub-account is required, wherein the account module stores:

(1) a configurable set of purchasing permissions, with preset baseline thresholds and permitted categories, for each of the one or more particular sub-accounts wherein the configurable set of purchasing permissions are set by the particular master account, and (2) a wish list for each of the one or more particular sub-accounts in which items whose purchase is not allowed by the particular master account are placed by the system for later purchase.

2. The method of claim 1, wherein each store further comprises one or more databases including a customer account database, a transaction database, and a master product database.

3. The system of claim 1, wherein the configurable set of purchasing permissions for each of the one or more particular sub-accounts further comprises a permission to complete a purchase of an item wherein the particular master account approves the purchase of an item by the one or more particular sub-accounts.

4. The system of claim 1, wherein the configurable set of purchasing permissions for each of the one or more particular sub-accounts are different for the one or more particular sub-accounts.

5. The method of claim 4, wherein the configurable set of purchasing permissions for each of the one or more particular sub-accounts further comprises one of no restriction on a purchase of a sub-account, an approval for all purchases of a sub-account, an approval for all purchases less than a predetermined amount of money for a sub-account, and an approval for certain types of items by category.

6. The method of claim 1, wherein controlling the purchasing of the one more particular sub-accounts associated with the particular master account further comprises notifying when a sub-account attempts to purchase an item, the particular master account that the sub-account is attempting to purchase an item, wherein the notification further comprises item information.

7. The method of claim 6, wherein the item information further comprises an item product name, an item brand name, an item model number, an item price and an item merchant.

8. The method of claim 6, wherein notifying the particular master account further comprises sending a message to the particular master account.

9. The method of claim 8, wherein the message further comprises one of an email message and a short message system message.

10. The method of claim 8, wherein the message further comprises a link that allows the particular master account to view the item the sub-account wants to purchase.

11. The method of claim 1 further comprising initiating an order of the item when the particular master account approves the item purchase by the sub-account.

12. The method of claim 11, wherein initiating the order of the item further comprises sending a notification to the sub-account that the item purchase has been approved and charging the item purchase to the particular master account.

13. The method of claim 1 further comprising registering a user as a master account.

14. The method of claim 1 further comprising providing accounts administration wherein the particular master account edits the permissions of the sub-accounts and views the purchase history for the master account and the related sub-accounts and wherein each sub-account can view the set of permissions of the sub-account and view of the purchase history of the sub-account.

15. The method of claim 14, wherein providing accounts administration further comprises permitting the particular master account to one of adding new sub-accounts, modifying existing sub-accounts and deleting sub-accounts.

16. The method of claim 1 further comprising validating access to the particular master account and the sub-accounts using two factor user authentication.

17. The method of claim 1 further comprising validating an approval of an item purchase by the sub-account by the master account.

18. The method of claim 17, wherein validating the approval of an item purchase further comprises providing a security code by the particular master account to validate the master account.

19. A system for conditional purchase, comprising:
one or more stores including a registered users store having one or more master accounts associated with the system and one or more sub-accounts associated with the system, wherein each particular master account is associated with to one or more particular sub-accounts;
a server that executes an ordering module that allows a user of a sub-account to place an order to purchase an item over a link; and
an account module, executed on the server, that controls the purchasing of the one more particular sub-accounts associated with the particular master account by determining if approval of the purchase of the item by the sub-account is required, wherein the account module stores:
(1) a configurable set of purchasing permissions, with preset baseline thresholds and permitted categories, for each of the one or more particular sub-accounts wherein the configurable set of purchasing permissions are set by the particular master account, and
(2) a wish list for each of the one or more particular sub-accounts in which items whose purchase is not allowed by the particular master account are placed by the system for later purchase.

20. The system of claim 19, wherein each store further comprises one or more databases including a customer account database, a transaction database, and a master product database.

21. The system of claim 19, wherein the configurable set of purchasing permissions for each of the one or more particular sub-accounts further comprises a permission to complete a purchase of an item wherein the particular master account approves the purchase of an item by the one or more particular sub-accounts.

22. The system of claim 19, wherein the configurable set of purchasing permissions for each of the one or more particular sub-accounts are different for the one or more particular sub-accounts.

23. The system of claim 22, wherein the configurable set of purchasing permissions for each of the one or more particular sub-accounts further comprises one of no restriction on a purchase of a sub-account, an approval for all purchases of a sub-account, an approval for all purchases greater than a predetermined amount of money for a sub-account, and an approval for certain types of items by category and an approval based on a pre-determined threshold.

24. The system of claim 19, wherein the ordering module sends a message to the master account when a particular sub-accounts tries to purchase an item that requires approval based on the configurable set of purchasing permissions, wherein the message includes an item product name, an item brand name, an item model number, an item price, and an item merchant.

25. The system of claim 24, wherein the message further comprises a link to the item so that the master account holder can view the item.

26. The system of claim 19, wherein the ordering module, if the particular master account approves an item purchase by the particular sub-account, initiates an order for the item including a notification to the particular sub-account that the purchase has been approved and charging the master account for the item purchase.

27. The system of claim 19, wherein the accounts module further comprises a new user registration module.

28. The system of claim 19, wherein the account module further comprises an account administration module that allows the particular master account to change the configurable set of purchasing permissions for each of the one or more particular sub-accounts and that allows each sub-account to view the configurable set of purchasing permissions for that sub-account.

29. The system of claim 19, further comprising a security module that controls access to the particular master account and one or more particular sub-accounts using two factor user authentication.

30. The system of claim 19, wherein the account module allows the particular master account to one of create a new sub-account, modify an existing sub-account and delete a sub-account.

31. The system of claim 19, wherein the account module further comprises a master account approval module to approve an item purchase by a sub-account wherein the approval of the item requires the particular master account to submit a security code to verify the particular master account holder.

32. The system of claim 31, wherein the security code further comprises one of a personal identification number and a security code to provide two factor authentication.

33. The system of claim 19, further comprising a conditional purchase unit that houses the one or more stores, the ordering module and the account module, a computing device associated with the particular master account, a computing device associated with each of the one or more particular sub-accounts and a link that is capable of connecting the conditional purchase unit and the computing devices to each other wherein the link is a wireline link or a wireless link.

34. The system of claim 19, wherein the account module times out, a request for the approval of an item purchase if the particular master account does not approve the item purchase within a predetermined amount of time, that is configurable, with a threshold.

* * * * *